(12) United States Patent
Chen

(10) Patent No.: US 8,583,168 B1
(45) Date of Patent: Nov. 12, 2013

(54) SPARE MOBILE PHONE

(75) Inventor: Shih-Hui Chen, Taoyuan Hsieh (TW)

(73) Assignee: Tennrich International Corp., Luchu Hsiang (TW)

( * ) Notice: Subject to any disclaimer, the term of this patent is extended or adjusted under 35 U.S.C. 154(b) by 0 days.

(21) Appl. No.: 13/490,568

(22) Filed: Jun. 7, 2012

(51) Int. Cl.
*H04M 1/00* (2006.01)

(52) U.S. Cl.
USPC ..................... 455/550.1; 455/575.1

(58) Field of Classification Search
USPC ............. 455/550.1, 558, 575.1, 575.2, 575.3, 455/575.4, 90.1, 90.3, 347, 351; 361/679.01
See application file for complete search history.

(56) References Cited

U.S. PATENT DOCUMENTS

2011/0058319 A1* 3/2011 Kim et al. ................ 361/679.01

* cited by examiner

*Primary Examiner* — Thanh Le

(74) *Attorney, Agent, or Firm* — Jackson IPG PLLC

(57) ABSTRACT

This invention discloses a spare mobile phone with a simple structure is a mobile phone that can be situated at a standby and backup state for a long time. The spare mobile phone includes a circuit board installed in a casing, and the circuit board is electrically coupled to at least one antenna module, a telecom signal processing module, a SIM card connecting module, a microprocessor module, and the casing includes a keys module electrically coupled to the microprocessor module, and a battery module for installing at least one battery of a default commercial specification.

4 Claims, 6 Drawing Sheets

SPARE MOBILE PHONE

BACKGROUND OF THE INVENTION

1. Field of the Invention

The present invention discloses a communication device telecommunication service, and more particularly to a spare mobile phone that can be situated at a standby and backup state for a long time.

2. Description of Related Art

In recent years, the semiconductor industry and the digital signal processing (DSP) technology bloom and promote the advancement of the electronic communication industry, so that people rely on electronic products such as mobile phones, computers, audio/video products more increasingly in our daily life, and the electronic products have become an indispensible part of our life.

Among the electronic products, mobile communication products are closely related to individuals, and the blooming of communications requires diversified applications of antennas in the wireless communication field, and digital mobile phones (or mobile phones) are considered to be the most convenient and quickest communication tools provided to communicate with others.

Due to advance in integrated circuits and digital technologies, the craze of mobile phones seems to be growing. We can see all kinds of advertisements of mobile phones and telecommunication providers on televisions, and mobile phones are becoming ubiquitous in everywhere. Meanwhile, the mobile phone developing is tending to be high performance and more function.

However, such a mobile phone development would complicate mobile phone structure, induce more power comsuption to mobile phone, and cause high cost. Therefore, it is necessary designing a mobile phone with high-capacity battery to have enough power supporting during working. However, it is probable that users fail in connection if the battery inside the mobile phone is unavailable, or the dedicated battery is unable to be obtained immediately in an emergency.

SUMMARY OF THE INVENTION

For reasons of the aforementioned issues, the present invention is to disclose a spare mobile phone which is suitable for long time standby and backup requirement.

To achieve the foregoing objective, the present invention provides a spare mobile phone, comprising: a casing, a circuit board, a set of antenna module with at least one antenna, a telecom signal processing module, a SIM card connecting module, a keys module, a battery module, and a microprocessor module, wherein the circuit board is installed in the casing; the antenna module is installed on the circuit board for transmitting and receiving wireless signals of a cellular mobile communication system; the telecom signal processing module is installed on the circuit board for performing a signal processing operation of the wireless signals transmitted or received by antenna module to perform a radio communication service within a service coverage of the cellular mobile communication system; the SIM card connecting module is installed on the circuit board and electrically coupled to the telecom signal processing module and provided for installing a SIM card; the keys module is installed at a predetermined position of the casing; and the battery module is installed at a predetermined position of the casing and provided for installing batteries of a commercial specification.

The microprocessor module installed on the circuit board is electrically coupled to the antenna module, the telecom signal processing module, the SIM card connecting module, the keys module, and the battery module; the microprocessor module is responsible for the signal processing operation from the antenna module, the telecom signal processing module, the SIM card connecting module, the keys module, and the battery module.

With the foregoing structural characteristics, the spare mobile phone with simple structure, low cost, and low power consumption is capable to situate at a standby and backup state for a long time, and the battery is easily available anywhere.

Wherein, the casing is comprised of a top casing and a bottom casing engaged with each other.

Wherein, the bottom casing includes a back cover which can be opened/shut repeatedly, and in which has a covered area includes installation positions of the SIM card connecting module and the battery module.

Wherein, the casing comprises a transparent window on the top casing and at a position corresponding to the battery module is provided for checking a battery condition.

Wherein, the casing includes a transparent window formed on the top casing and the bottom casing and at positions corresponding to the battery module respectively and provided for checking a battery condition.

Wherein, the spare mobile phone includes at least one light emitting diode (LED) installed on the circuit board and electrically coupled to the microprocessor.

Wherein, the battery module is provided for installing a battery of a commercial AA specification.

In summation, the spare mobile phone of the present invention has the following advantages and effects:

1. The simple structure of the mobile phone incurs a lower cost and provides an application as a backup phone.
2. The simple structure of the mobile phone features a simple, easy and convenient operation.
3. The simple structure of the mobile phone features a low power consumption that can extend the standby time.
4. The simple structure of the spare mobile phone using a battery of a common commercial specification; the battery is easily available anywhere, that the mobile phone can significant reduce the risk of failing in access caused by unavailable batteries.
5. The transparent window is provided for users to check a battery condition anytime; users can monitor the situation to avoid circuit damaged by electrolyte leaking from battery.

DETAILED DESCRIPTION OF THE PREFERRED EMBODIMENTS

Figure 1:
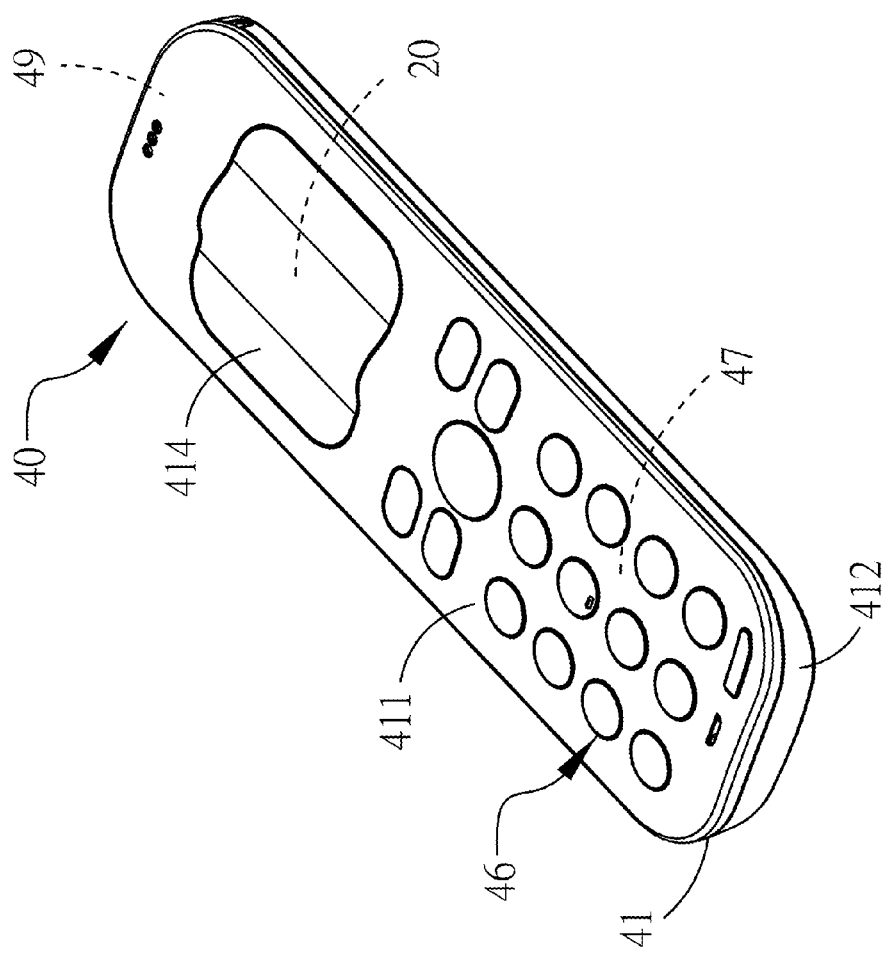
FIG. 1 is a perspective view of a spare mobile phone of the present invention.

The technical characteristics of the present invention will become apparent with the detailed description of preferred embodiments and the illustration of related drawings as follows.

With reference to FIGS. 1 to 4 for a perspective view, an exploded view, a schematic block diagram and a planar view of a spare mobile phone of the present invention respectively, the spare mobile phone 40 comprises a casing 41, a circuit board 42, at least one antenna module 43, a telecom signal processing module 44, a subscriber identity module (SIM) card connector module 45, a keys module 46, a battery module 47, and a microprocessor module 48.

The casing 41 is comprised of a top casing 411 and a bottom casing 412 engaged with each other. In practice, the bottom casing 412 of the casing 41 includes a back cover 413 that can be opened/shut repeatedly, and the covered area of the back cover 413 preferably covers the installation positions of the SIM card connecting module 45 and the battery module 47 to facilitate users to install or replace a SIM card 10 and a battery 20.

The circuit board 42 is a mechanical structure installed in the casing 41 and mainly provided for installing and electrically coupling related modules. In practice, the circuit board 42 can be a single-sided or double-sided printed circuit board.

The antenna module 43 is installed on the circuit board 42 and provided for transmitting and receiving a wireless signal of a cellular mobile communication system. In practice, the antenna module 43 can be tuned to a transmission frequency operation applicable for a GSM900 MHz/1800 MHz cellular mobile communication system, or tuned to a transmission frequency operation applicable for a GSM840 MHz/1900 MHz cellular mobile communication system.

The telecom signal processing module 44 is installed on the circuit board 42 for performing a signal processing operation of the wireless signal transmitted or received by the antenna module 43 to perform a voice/message communication service within service coverage of the cellular mobile communication system.

The SIM card connecting module 45 is installed on the circuit board 42 and electrically coupled to the telecom signal processing module 44, and provided for installing the SIM card 10.

The keys module 46 is installed at a predetermined position of the casing 41, and provided for users to dial a call, turn on/off the spare mobile phone 40, set other functions, or switch operations.

The battery module 47 is installed at a predetermined position of the casing 40 and provided for installing at least one battery of a default commercial specification. In practice, the battery module 47 is provided for installing the battery 20 of a commercial AA specification as shown in the figures (FIG. 1, FIG. 2, FIG. 4, FIG. 5).

The microprocessor module 48 is installed on the circuit board 42 and electrically coupled to the at least one antenna module 43, the telecom signal processing module 44, the SIM card connecting module 45, the keys module 46, and the battery module 47. The microprocessor module 48 is a core module of the whole spare mobile phone 40 and comprises a microprocessor chip responsible for the signal processing operation among the at least one antenna module 43, the telecom signal processing module 44, the SIM card connecting module 45, the keys module 46, and the battery module 47.

Figure 5:
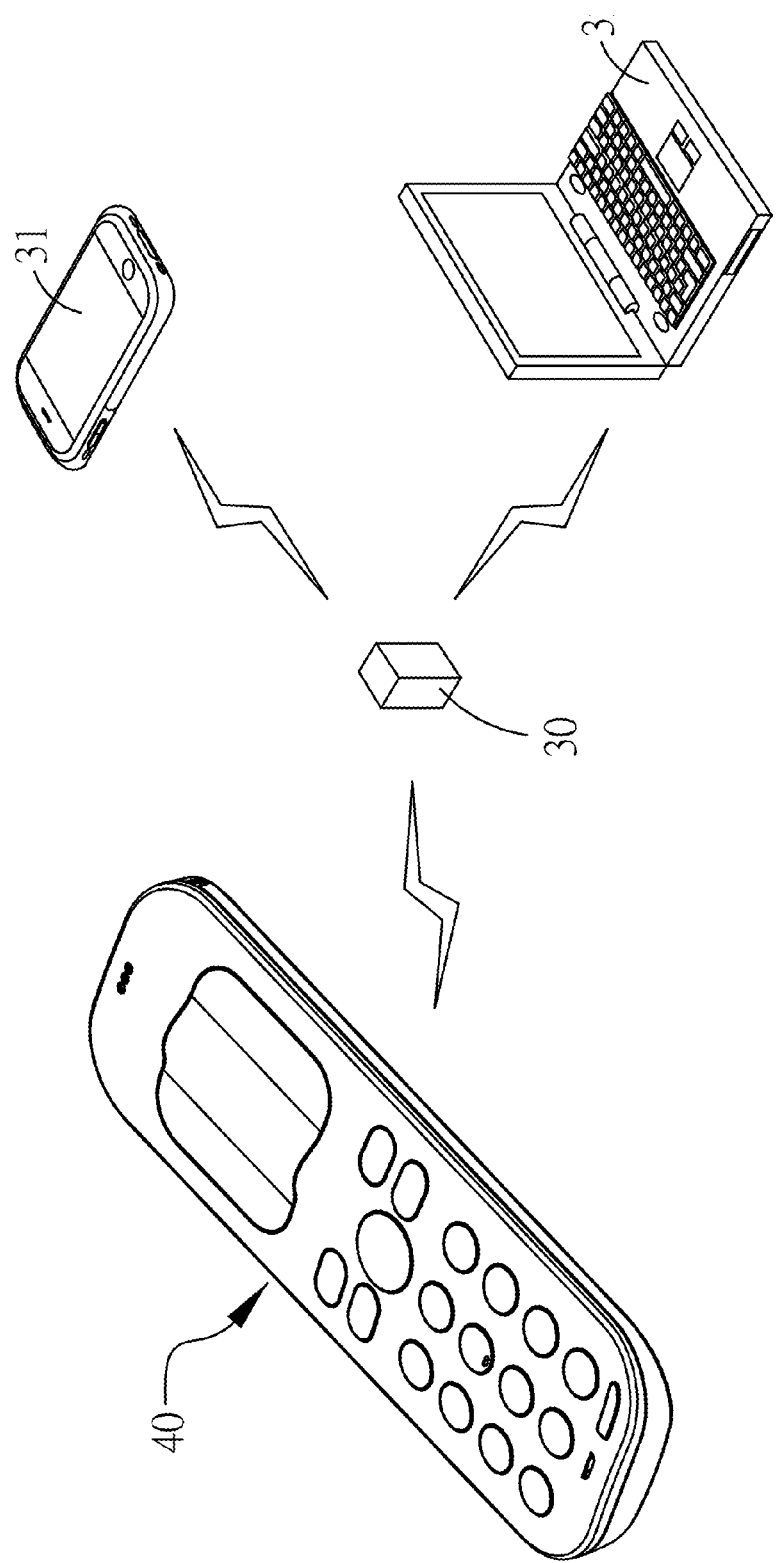
FIG. 5 is a schematic view of using a spare mobile phone of the present invention.

When the spare mobile phone 40 of the present invention is used, it is necessary to install the SIM card 10 and the battery 20 at the positions of the SIM card connecting module 45 and the battery module 47 respectively. After the mobile phone is powered on, the telecom signal processing module 44 confirms the validity of the SIM card 10 to connect a cellular mobile communication service (GSM communication network) provided by a respective telecommunication company 30 in order to dial a local call, a call to a mobile phone of the same telecommunication company, a call to a mobile phone of a different telecommunication company, or an Internet phone (Skype) as shown in FIG. 5 so as to perform a voice/message exchange with a caller or receiver of a mobile phone 31 or an Internet phone 32, or even achieve the international roaming.

For emergencies or when a user needs help from related departments (such as the fire department, rescue department and police department), the user can dial a crisis hotline 112 from the mobile phone directly without installing any SIM card. The aforementioned structure constitutes a spare mobile phone with the features of low cost, low power consumption, long standby time, and an easily available battery.

Figure 6:
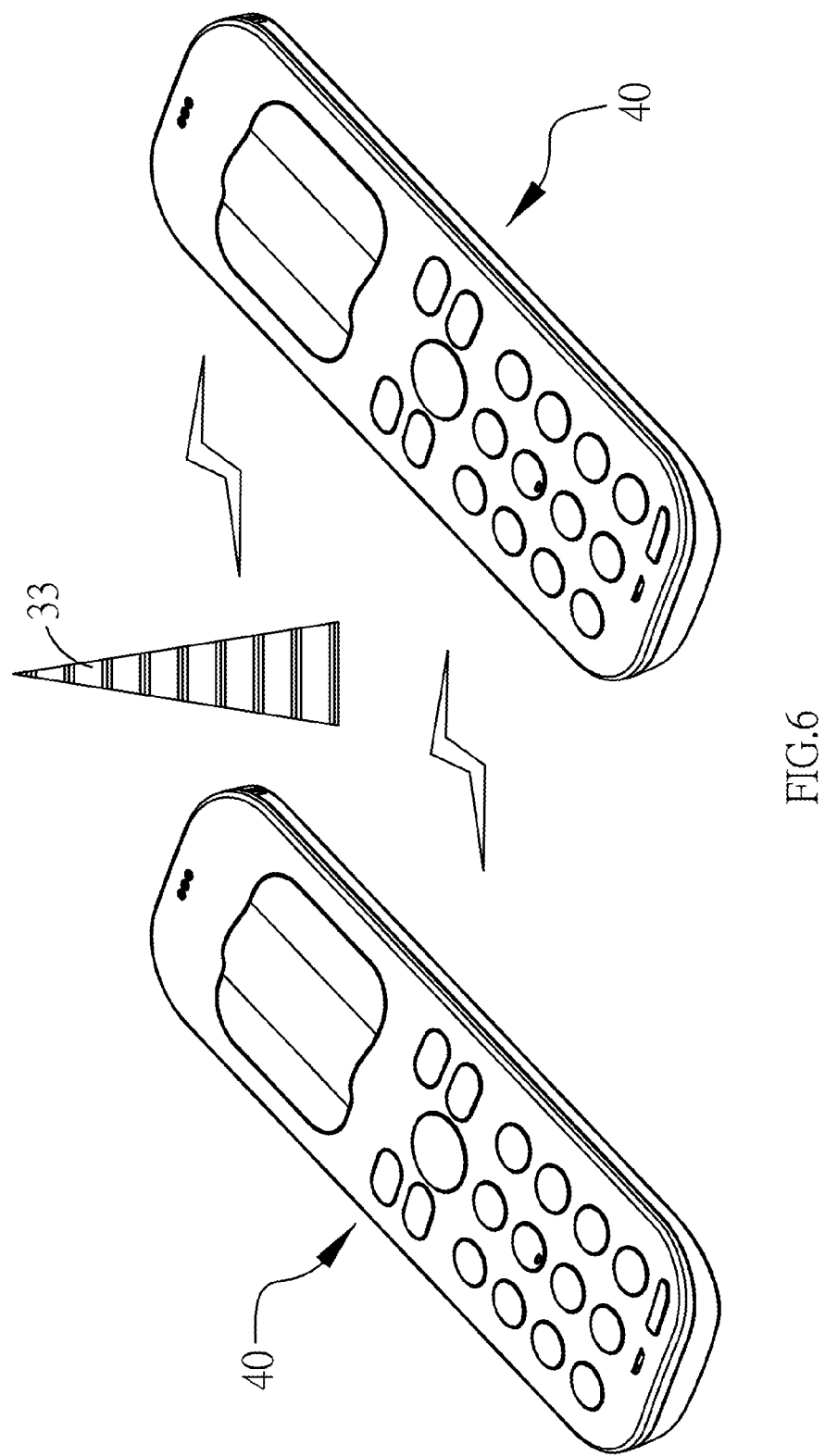
FIG. 6 is a schematic view of a first way of using a spare mobile phone of the present invention.

Since the spare mobile phone of the present invention has the advantages of low cost, low power consumption and an easily available battery, the mobile phone can be used as an emergency backup mobile phone, or used by a plurality of preset spare mobile phones 40 to have a free call through a single base station of the telecommunication company as shown in FIG. 6, so as to replace the use of the conventional walkie-talkies.

It is noteworthy that the spare mobile phone of the present invention adopts a battery of a general commercial AA specification for its operation, the battery is easily available anywhere, that the battery can significant reduce risk of failing access caused by unavailable batteries.

Figure 2:
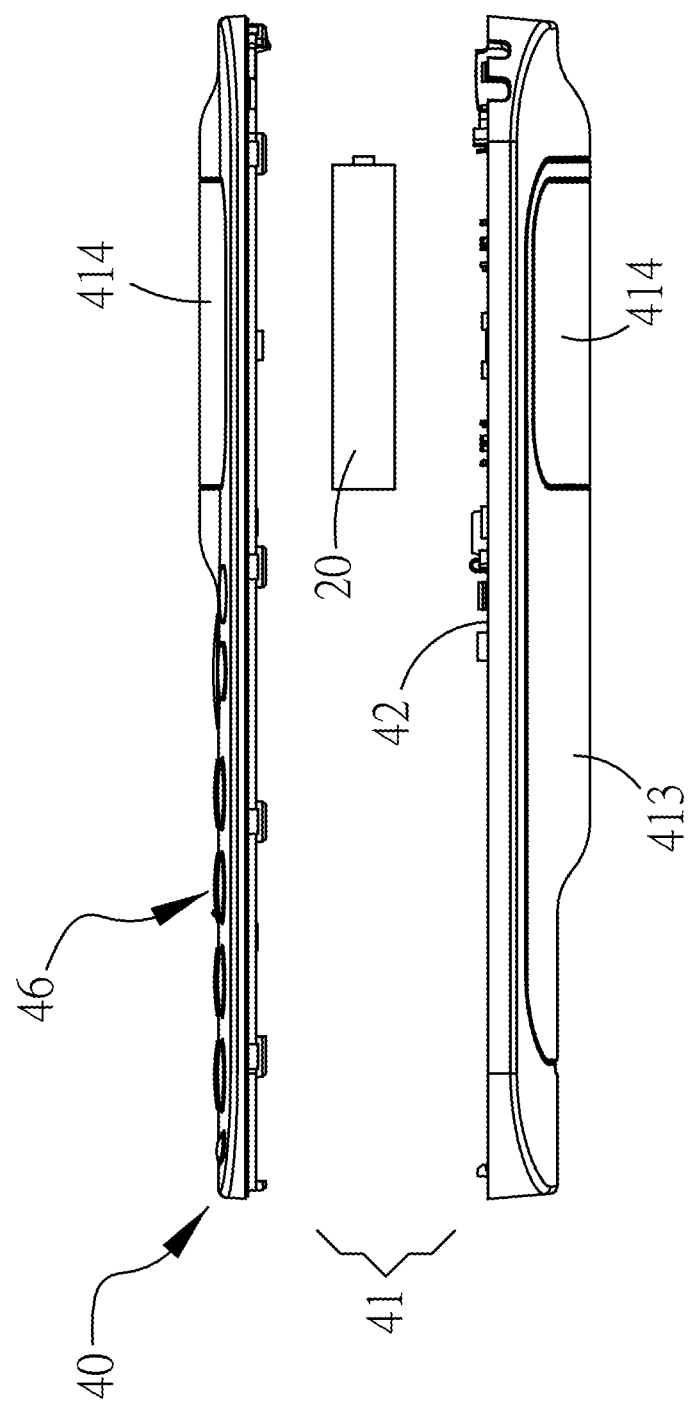
FIG. 2 is an exploded view of a spare mobile phone of the present invention.
Figure 3:
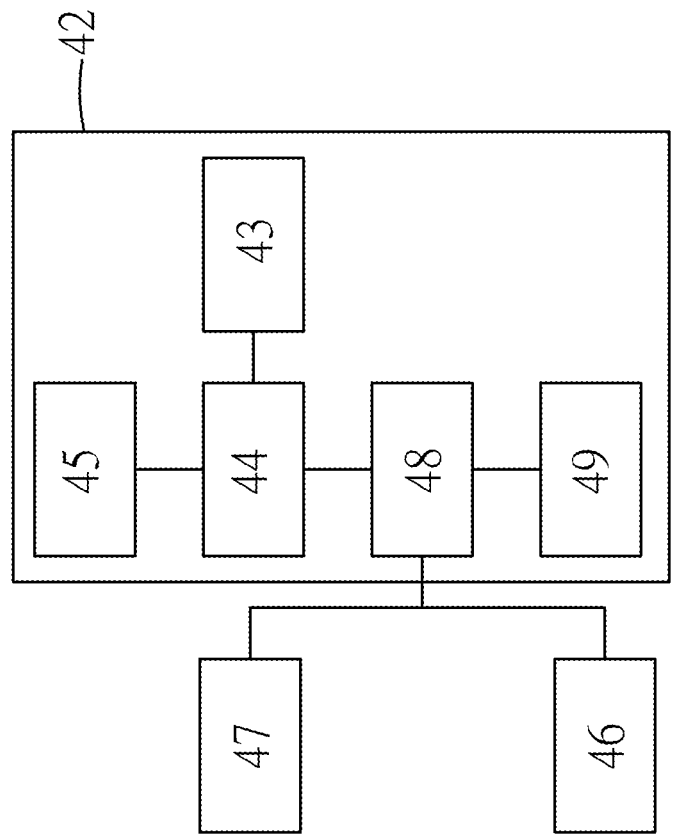
FIG. 3 is a schematic block diagram of a spare mobile phone of the present invention.
Figure 4:
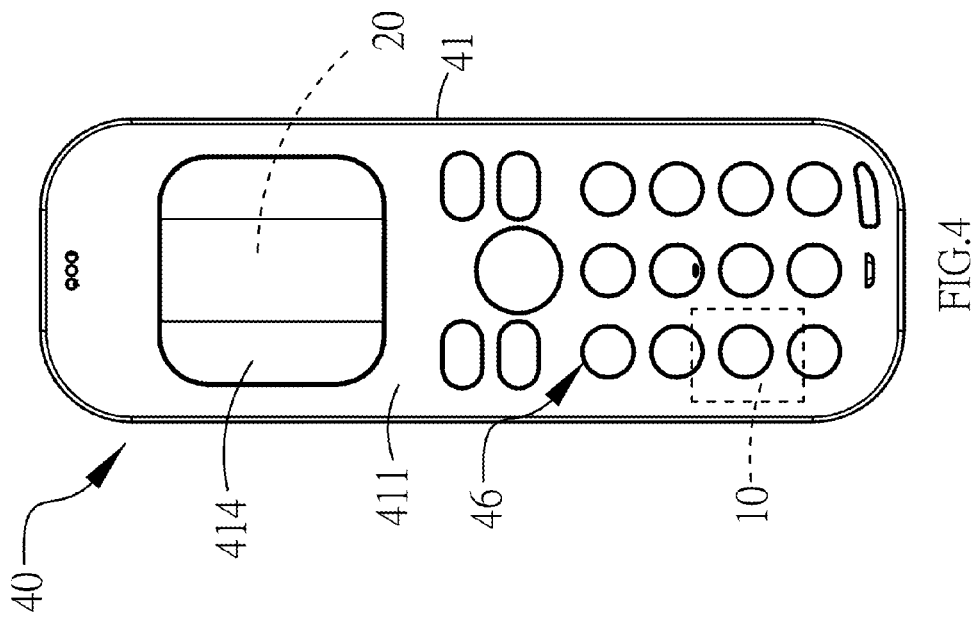
FIG. 4 is a planar view of a spare mobile phone of the present invention.

Further, one transparent window 414 is formed on the top casing 411 of the casing 41 and at a position corresponding to the battery module 47 for checking a battery condition as shown in FIG. 1, or a transparent window 414 is formed on the top casing 411 and the bottom casing 412 of the casing 41 and at positions corresponding to the battery module 47 respectively for checking the condition of the battery 20 as shown in FIG. 2.

Users can check the condition of the battery 20 through the transparent window 414 anytime. Users can monitor the situation to avoid circuit damaged by electrolyte leaking from battery, and the spare mobile phone of the present invention further comprises at least one LED 49 installed on the circuit board and electrically coupled to the microprocessor. The LED 49 can be turned on directly to provide emergency illuminations when needed.

Compared with the conventional structure, the spare mobile phone of the present invention features a simple structure, low cost, simple, easy and convenient operation, low power consumption and a long standby time, and thus is suitable to be a backup mobile phone. In particular, the spare mobile phone of the present invention adopts a battery of a common commercial specification, the battery is easily available anywhere, that the mobile phone can significant reduce risk of failing access caused by unavailable batteries.

In summary of the above description, the present invention provides a more feasible spare mobile phone and complies with patent application requirements, and thus is duly filed for patent application. While the invention has been described by means of specific embodiments, numerous modifications and variations could be made thereto by those skilled in the art without departing from the scope and spirit of the invention set forth in the claims.

The invention claimed is:

1. A spare mobile phone, comprising:
   a casing;
   a circuit board, installed in the casing; with at least one antenna module, installed on the circuit board for transmitting and receiving wireless signals in a cellular mobile communication system;

a telecom signal processing module, installed on the circuit board, for performing a signal processing operation corresponding to the wireless signal transmitted or received by at least one antenna module to perform a radio communication service within a service coverage of the cellular mobile communication system;

a subscriber identity module (SIM) card connecting module, installed on the circuit board and electrically coupled to the telecom signal processing module, for installing a SIM card;

a keys module, installed at a predetermined position of the casing;

a battery module, installed at a predetermined position of the casing for installing at least one battery of a default commercial specification;

a microprocessor module, installed on the circuit board, and electrically coupled to at least one antenna module, the telecom signal processing module, the SIM card connecting module, the keys module, and the battery module, and responsible for the signal processing operation among the antenna modules, the telecom signal processing module, the SIM card connecting module, the keys module, and the battery module, wherein the casing is comprised of a top casing and a bottom casing engaged with each other, the casing further comprising a transparent window on the top casing, such that the window position is corresponsive to the battery module used for checking the situation of a battery.

2. The spare mobile phone of claim 1, wherein the bottom casing includes a cover which can be opened/shut repeatedly, in which a cover area includes installation positions of the SIM card connecting module and the battery module.

3. The spare mobile phone of claim 1, wherein the spare mobile phone includes at least one light emitting diode (LED) installed on the circuit board and electrically coupled to the microprocessor.

4. The spare mobile phone of claim 1, wherein the battery module provides a power source by installing a battery of a commercial AA specification.

\* \* \* \* \*

UNITED STATES PATENT AND TRADEMARK OFFICE
CERTIFICATE OF CORRECTION

PATENT NO. : 8,583,168 B1
APPLICATION NO. : 13/490568
DATED : November 12, 2013
INVENTOR(S) : Chen et al.

It is certified that error appears in the above-identified patent and that said Letters Patent is hereby corrected as shown below:

Title Page, Item (12) "Chen" should read -- Chen, et al. --.

Title Page, Item (75) Inventor is corrected to read:
-- Shih-Hui Chen, Taoyuan Hsieh (TW);
Alan Cymberknoh, Hong Kong (HK) --.

Page 1 of 1

Signed and Sealed this
First Day of March, 2016

Michelle K. Lee
*Director of the United States Patent and Trademark Office*